United States Patent
Auth et al.

(10) Patent No.: US 7,092,736 B2
(45) Date of Patent: Aug. 15, 2006

(54) RADIO COMMUNICATION SYSTEM

(75) Inventors: Elisabeth Auth, München (DE);
Hans-Joachim Dressler, Ulm (DE);
Andreas Gerwens, Ulm (DE); Ralf Hofmann, Heidenheim (DE); Roland Riedlinger, Tilehurst (GB); Markus Rösch, Oberhaching (DE)

(73) Assignee: Siemens Aktiengesellschaft, Munich (DE)

( * ) Notice: Subject to any disclaimer, the term of this patent is extended or adjusted under 35 U.S.C. 154(b) by 14 days.

(21) Appl. No.: 10/501,712

(22) PCT Filed: Jan. 16, 2003

(86) PCT No.: PCT/EP03/00409

§ 371 (c)(1),
(2), (4) Date: Jul. 19, 2004

(87) PCT Pub. No.: WO03/061316

PCT Pub. Date: Jul. 24, 2003

(65) Prior Publication Data

US 2005/0079854 A1  Apr. 14, 2005

(30) Foreign Application Priority Data

Jan. 17, 2002 (EP) .................. 02001276

(51) Int. Cl.
*H04B 1/38* (2006.01)
*H04M 1/00* (2006.01)
(52) U.S. Cl. .......... 455/561; 455/560; 455/11.1; 455/20; 455/22
(58) Field of Classification Search ............ 455/82–83, 455/84, 88, 550.1, 560, 561, 11.1, 20, 22, 455/25
See application file for complete search history.

(56) References Cited

U.S. PATENT DOCUMENTS 5,781,865 A  7/1998  Gammon (Continued)

FOREIGN PATENT DOCUMENTS

DE  19707057 A1  9/1998

(Continued)

OTHER PUBLICATIONS

3GPP TS 25.430, v3.6.0 (Jun. 2001), Technical Specification, 3rd Generation Partnership Project, Technical Specification group Radio Access Network, UTRAN lub Interface, General Aspects and Principles (Release 1999), pp. 1-23.

(Continued)

*Primary Examiner*—Matthew Anderson
*Assistant Examiner*—Tuan Pham
(74) *Attorney, Agent, or Firm*—Staas & Halsey LLP (57) ABSTRACT

A base station is provided in a radio communication system by which first communication connections and second communication connections are transmitted. A first radio network controller is provided, by which the first communication connections are transmitted and also a second radio network controller, by which the second communication connections are transmitted. The base station comprises a common high frequency component which processes signals for the first communication connections and signals for the second communication connections. The signals of the first communication connections and the second communication connections are transmitted across an air gap at different carrier frequencies and can be sent by different carriers.

14 Claims, 5 Drawing Sheets

U.S. PATENT DOCUMENTS

| | | | |
|---|---|---|---|
| 6,173,189 B1 * | 1/2001 | Lockhart | 455/561 |
| 6,246,878 B1 * | 6/2001 | Wallentin | 455/442 |
| 6,738,625 B1 * | 5/2004 | Oom et al. | 455/453 |
| 2002/0086677 A1 * | 7/2002 | Hildebrand | 455/446 |
| 2002/0110189 A1 * | 8/2002 | Souissi et al. | 375/235 |
| 2002/0123348 A1 * | 9/2002 | Willars et al. | 455/436 |
| 2002/0128007 A1 * | 9/2002 | Miyatani | 455/423 |
| 2003/0190915 A1 * | 10/2003 | Rinne et al. | 455/436 |
| 2004/0252660 A1 * | 12/2004 | Ahmavaara | 370/328 |

FOREIGN PATENT DOCUMENTS

| | | |
|---|---|---|
| DE | 69517266 T2 | 10/2000 |
| EP | 0699342 B1 | 5/2000 |
| EP | 1096818 A1 | 5/2001 |
| WO | WO01/50795 A1 | 7/2001 |

OTHER PUBLICATIONS

Breyer et al., "UMTS Node B Architecture in a Multi-Standard Environment", Alcatel Telecommunications Review, 1st Quarter 2001, pp. 50-54.

Reg TP definiert Bedingungen für UMTS-Kooperationen (Reg TP defines conditions for UMTS cooperation), Jun. 5, 2001, pp. 1 and 2, in http://www.teltarif.de/arch/2001/kw23/s5340.html.

UTMS—Infrastruktursharing (UMTS Infrastructure Sharing), Jun. 5, 2001, pp. 1 and 2, in http://www.regtp.de/aktuelles/pm/02118/index.html.

Thesenpapier Infrastruktur—Sharing (Infrastructure Sharing paper), 1 page, in http://www.regtp.de/reg_tele/start/in_05-05-03-05-00_m/index.html, printed on Nov. 16, 2001.

* cited by examiner

RADIO COMMUNICATION SYSTEM

CROSS REFERENCE TO RELATED APPLICATIONS

This application is based on and hereby claims priority to PCT Application No. PCT/EP03/00409 filed on Jan. 16, 2003 and European Application No. 02001276.1 filed on Jan. 17, 2002, the contents of which are hereby incorporated by reference.

BACKGROUND OF THE INVENTION

Radio communication systems are used for transmitting information, speech or data, with the aid of electromagnetic waves over a radio interface, also called an air interface, between a sending and a receiving radio terminal. Radio communication systems can be subdivided into a core network and a Radio Access Network (RAN). User data and signaling data of a plurality of terminals is line-conducted over large distances in the core net. In addition, a connection to a fixed communication network can be implemented via the core network. In the radio access network, data received from the terminals is converted into a format suitable for transmission in the core network. Additionally, the form of data received by the core network is adapted to radio transmission and forwarded to the relevant radio terminal, within the send area of which the terminal involved is located.

Radio communication systems of the first and second generation are currently in use around the world and, because of the great demand for mobile communication, are coming up against the limits of their capacity. The emerging capacity problems are to be resolved by the third-generation radio communication systems. One of the third-generation radio communication systems which shows the greatest promise of success is the Universal Mobile Telecommunication System (UMTS) that was specified by the standardization body 3GPP (Third Generation Partnership Project) (see for example: B. Walke, Mobilfunknetze und ihre Protokolle [Mobile radio networks and their protocols], Volume 1, pp. 370–396, Teubner Verlag 2000).

In UMTS several 5-MHz-wide frequency channels are available within a 60-MHz band for transmission via the air interface. The various 5-MHz-wide frequency channels can here be assigned to different mobile radio operators. For each of the 5-MHz-wide frequency channels it is necessary, in accordance with the terms of UMTS allocation, to set up an independent infrastructure with a core network and a radio access network.

As is apparent from the press release from the regulatory authority for telecommunications and post, UMTS Infrastructure Sharing of 5 Jun. 2001, and from the Infrastructure Sharing paper (Thesenpapier Infrastruktur-Sharing), the shared use of land, masts, antennas, cables and combiners by several operators is permissible. Also covered by this is the shared use of a cabinet in which base stations, amplifiers and power supply are housed, as well as the use of logically split base stations and/or radio network controllers, providing it is ensured that each operator has independent control of its own logical unit.

S. Breyer et al., "UMTS node B architecture in a multi-standard environment", Alcatel Telecommunications Review, 1st Quarter 2001, pages 50–54 discloses a multi-standard Node B which can process connections in accordance with the UMTS standard as well as in accordance with the GSM standard. The Node B has a common control unit and a common transmission unit for exchanging data with the relevant core network. Separate send and receive devices as well as signal processing devices are used for each standard for transmissions via the air interface.

U.S. Pat. No. 5,781,865 discloses a mobile radio system that allows a plurality of PCS operators to operate common antenna locations. A common bandpass filter and a common amplifier are provided here downstream of the respective antenna. The signals are assigned to the individual operators using a splitter.

SUMMARY OF THE INVENTION

One possible object of the invention is to specify a radio communication system suitable for transmission in different frequency channels.

A base station is provided, via which the first communication connections, for which signals are transmitted via an air interface using a first carrier frequency, and second communication connections, for which signals are transmitted via the air interface using a second carrier frequency, are sent. The first communication connections are sent via a first radio network controller. The second connections are sent via a second radio network controller. The base station has a common high-frequency component which processes signals for the first communication connections and signals for the second communication connections. By using the first carrier frequency the first communication connections are transmitted in a first frequency channel, and by using the second carrier frequency the second communication connections are transmitted in a second frequency channel. The first frequency channel and the second frequency channel can be allocated to different operators.

The base station has a first communication port and a second communication port, the first communication port being connected via a first interface to the first radio network controller and the second communication port being connected via a second interface to the second radio network controller. In the base station the first communication connections are sent via the first communication port and the second communication connections are sent via the second communication port. The first communication connections and the second communication connections are each assigned an identifier. The first and second communication connections respectively are in this case assigned on the basis of the identifier to the first and second communication port respectively.

The inventors propose not restricted in the 3GPP standard, assigning a communication port to a software-generated functional unit within a base station using a unique identifier. A functional unit in this connection is defined as an entirety of the resources to be implemented, which are covered by the logical model of the base station described in standard 3GPP TS 25.430 V3.6.0 (UTRAN Iub Interface: General Aspects and Principles (Release 1999)) and consequently ensure behavior conforming to the relevant 3GPP specification on the external interfaces (Iub interface and Uu interface) of a base station.

As a result a plurality of logical relationships are possible between the base station and different radio network controllers. A fixed assignment takes place between the respective radio network controller and the respective communication port.

The high-frequency component may have a send branch and a receive branch. The send branch and the receive branch are connected to an antenna via a duplex filter for separating send and receive band. The send branch comprises a power amplifier. The receive branch comprises a pre-amplifier and a splitter connected to the output of the pre-amplifier. The splitter has two outputs. At each of the two outputs of the splitter the signal is present in broadband form, in other words all frequencies. In the downstream mixer stages the frequency required in each case is filtered out. Since in this arrangement received signals are first amplified by the pre-amplifier and then split according to their carrier frequency, a favorable signal/noise ratio is achieved at the input of the pre-amplifier. Splitting the antenna signal in the receive direction would result in a power loss of at least half in each antenna branch, which would lead to a deterioration in the signal/noise ratio. This is avoided by using a common pre-amplifier.

In order to implement a diversity of reception it is advantageous to provide the common high-frequency component with a first high-frequency branch and a second high-frequency branch, the first high-frequency branch being connected to a first antenna and the second high-frequency branch to a second antenna. The first high-frequency branch and the second high-frequency branch have essentially the same structure. The first high-frequency branch and the second high-frequency branch each have a duplex filter, a send branch with a power amplifier and a receive branch with a pre-amplifier and a splitter. Signals with the first carrier frequency are sent to the send branch of the first high-frequency branch and signals with the second carrier frequency are sent to the send branch of the second high-frequency branch.

In order to implement a diversity of transmission, for each send branch to have a combiner, to which signals with the first carrier frequency and signals with the second carrier frequency are sent, and which is connected to the input of the power amplifier. As a result, signals with the first carrier frequency and signals with the second carrier frequency are transmitted via both antennas. Since the signals are combined upstream of the power amplifier, a power amplifier can be employed which possesses the same total output power as an amplifier which supports just one frequency. Were the signals to be combined downstream of the power amplifier outputs, the closely adjoining carrier frequencies would mean hybrid combiners would have to be employed which exhibit a loss of at least 3 dB per carrier frequency. Hence the output power of the power amplifiers would have to be doubled, which entails disadvantages, such as for example high DC power draw and high dissipation power. These disadvantages are avoided in that the signals with the first carrier frequency and the signals with the second carrier frequency are already combined upstream of the power amplifier.

In order to set up a radio communication system with a plurality of sectors a common high-frequency component may be provided for each sector.

According to an embodiment the base station has a signal processing device in which the dp (data processing) programs are provided to process the signals with the first carrier frequency and the signals with the second carrier frequency. In a first dp program first data is processed for the first communication connections by processing the signals with the first carrier frequency and in a second dp program second data is processed for the second communication connection by processing the signals with the second carrier frequency. The first dp program and the second dp program here access different databases which are independent of one another. The signal processing device in each case has an AD/DA conversion unit, and for generating or down-mixing high-frequency signals, a baseband processor, a control unit, and an interface unit. By the dp programs the signal processing unit is logically split into two separate signal processing devices. During signal processing no exchange of any kind takes place between the first data processing program and the second data processing program. For signals with the first carrier frequency or first data, the signal processing unit represents an interface to the first radio network controller. For signals with the second carrier frequency or second data, the signal processing device represents the interface to the second radio network controller. The first radio network controller and the second radio network controller can be employed by different operators.

Preferably the base station has a plurality of signal processing devices which are employed as a pool, in order to process signals from first communication connections and signals from second communication connections. As a result the processing capacity of the base station is increased.

The system and base station can analogously be applied to the case in which communication connections are transmitted via more than two frequency channels of more than two operators. Since several frequency channels can be allocated to one operator, the number of operators can be less than or equal to the number of frequency channels.

The system and base station can be used for radio communication systems of all radio standards in which the various operators are separated from one another by difference carrier frequencies, e.g. the UMTS standard.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

A radio communication system (see FIG. 1) comprises a first core network CN1 which communicates with a first radio network controller RNC1. The first radio network controller RNC1 is controlled by a first operation and maintenance center OMC1. The first core network CN1, the first radio network controller RNC1 and the first operation and maintenance center OMC1 are assigned here to a first operator B1.

Figure 1:
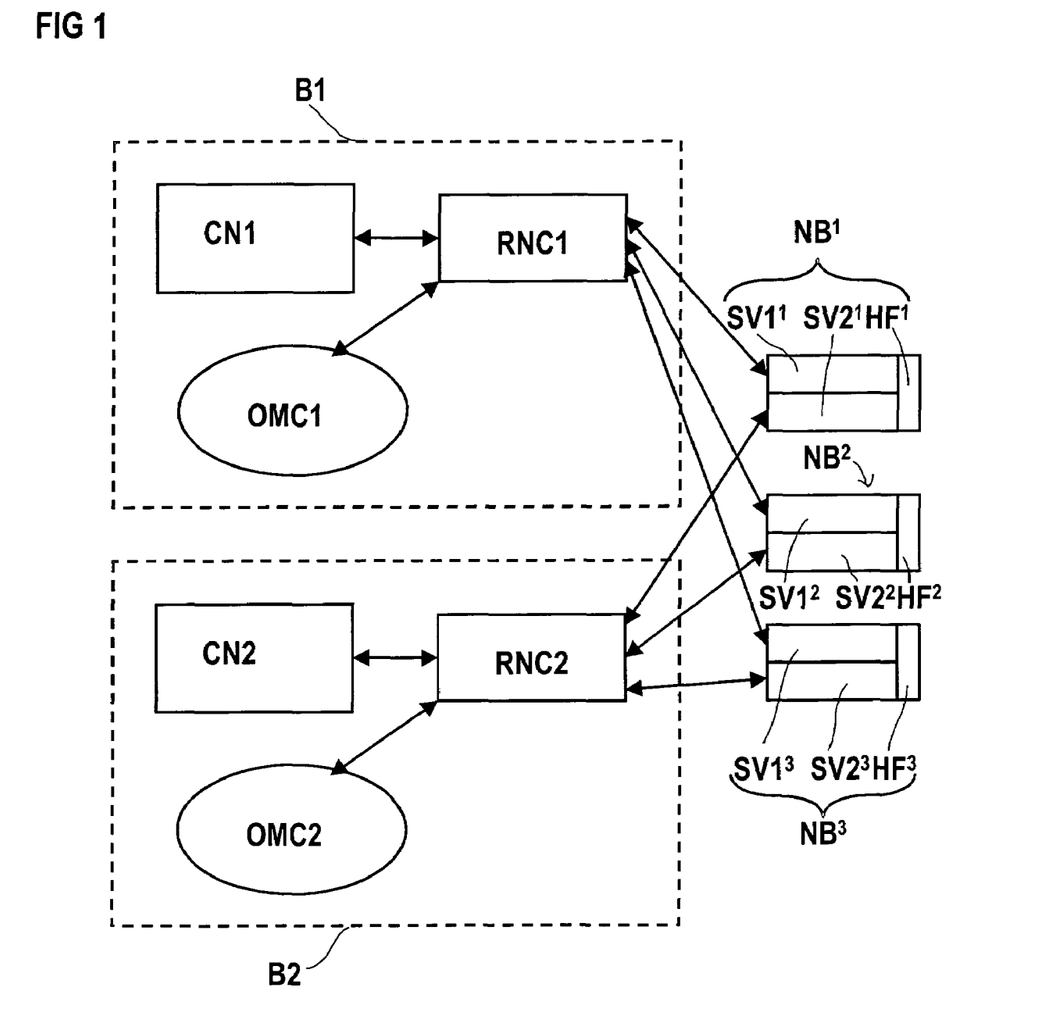
FIG. 1 shows a radio communication system used by two different operators.

The radio communication system further comprises a second core network CN2 which communicates with a second radio network controller RNC2. The second radio network controller RNC2 is controlled by a second operation and maintenance center OMC2. The second core network CN2, the second radio network controller RNC2 and the second operation and maintenance center OMC2 are assigned here to a second operator B2.

The radio communication system further comprises three base stations $NB^1$, $NB^2$, $NB^3$. Each of the base stations $NB^i$, i=1,2,3, comprises a common high-frequency component $HF^i$, plus a first signal processing device $SV1^i$ and a second signal processing device $SV2^i$.

Signals for first communication connections which are sent by the first operator B1 are in each case processed in the first signal processing devices $SV1^i$. Signals for second communication connections which are sent by the second operator B2 are in each case processed in the second signal processing devices $SV2^i$. Signals of the first communication connections and signals of the second communication connections are both processed in the common high-frequency component $HF^i$.

Since the base stations $Nb^i$ process signals of first communication connections which are sent by the first operator B1 as well as signals of second communication connections which are sent by the second operator B2, the infrastructure requirement is reduced for the individual operators B1, B2.

Figure 2:
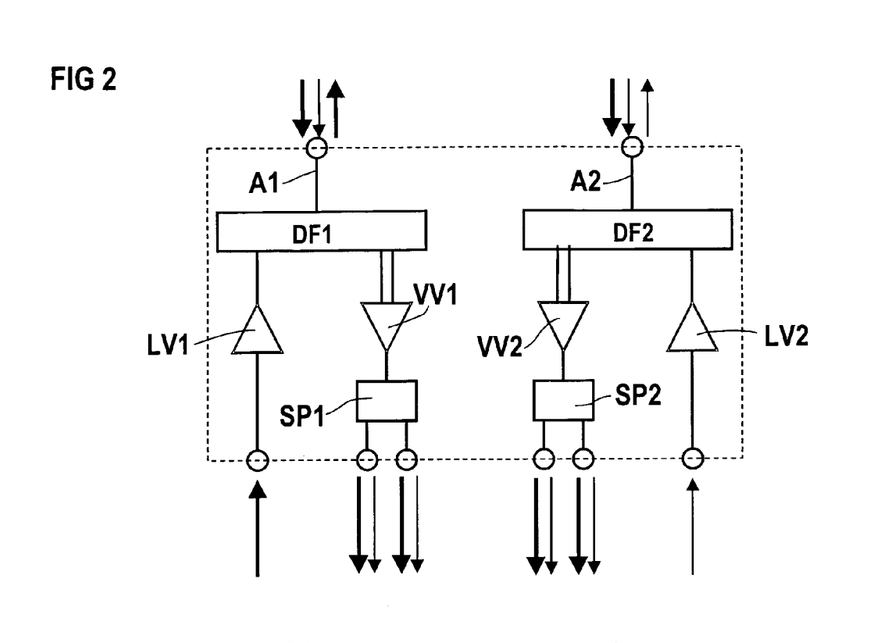
FIG. 2 shows a common high-frequency component for a base station with a diversity of transmission.

A common high-frequency component suitable for diversity of reception has two separate high-frequency branches (see FIG. 2). A first high-frequency branch is provided with an antenna A1 which is connected to a first duplex filter DF1. The first duplex filter DF1 splits send and receive band. A first send branch comprises a first power amplifier LV1 which is connected to the first duplex filter DF1. A first receive branch comprises a first low-noise pre-amplifier VV1, the inputs of which are connected to the first duplex filter DF1, and the output of which is connected to a first splitter SP1. The splitter SP1 has two outputs. At each of the two outputs of the splitter the signal is present in broadband form, in other words all frequencies. In the downstream mixer stages the frequency required in each case is filtered out.

A second high-frequency branch has a second antenna A2 which is connected to a second duplex filter TF2 for splitting send and receive band. The second duplex filter DF2 is connected to a second send branch with a second power amplifier LV2. The second duplex filter DF2 is further connected to a second receive branch with a second pre-amplifier VV2 and a second splitter SP2. The inputs of the second pre-amplifier VV2 are connected to the second duplex filter DF2, and the output of the second pre-amplifier VV2 is connected to the input of the second splitter SP2. The second splitter SP2 has two outputs. At each of the two outputs of the splitter the signal is present in broadband form, in other words all frequencies. In the downstream mixer stages the frequency required in each case is filtered out. In FIG. 2 the signals with different carrier frequencies are designated by incoming or outgoing arrows respectively with different line widths. Signals of a first carrier frequency are present at the input of the first power amplifier LV1, and signals of a second carrier frequency are present at the input of the second power amplifier LV2. The signals with the first carrier frequency are sent via the first antenna A1, and the signals with the second carrier frequency are sent via the second antenna A2.

On the basis of FIG. 3 a common high-frequency component is explained below which is suitable for a diversity of transmission and reception. The high-frequency component comprises a first high-frequency branch with a first antenna A1', a first duplex filter DF1', a first receive branch and a first send branch. The first receive branch has a first pre-amplifier VV1' and a first splitter SP1', the output of the first pre-amplifier VV1' being connected to the input of the first splitter SP1'. The first splitter SP1' has two outputs. At each of the two outputs of the first splitter SP1' the signal is present in broadband form, in other words all frequencies. In the downstream mixer stages the frequency required in each case is filtered out. The first send branch comprises a first power amplifier LV1', the input of which is connected to the output of a combiner KO1'. The first combiner KO1' has two inputs, at which signals with a different carrier frequency are present. The first combiner KO1' brings the signals with different carrier frequency together to an output.

A second high-frequency branch comprises a second antenna A2', a second duplex filter DF2' for splitting send and receive band, a second receive branch and a second send branch. The second receive branch comprises a second pre-amplifier VV2', the output of which is connected to a second splitter SP2'. The second splitter SP2' has two outputs. At each of the two outputs of the second splitter the signal is present in broadband form, in other words all frequencies. In the downstream mixer stages the frequency required in each case is filtered out. The second send branch comprises a second power amplifier LV2', the input of which is connected to the output of a second combiner KO2'. The second combiner KO2' has two inputs, at which signals with a different carrier frequency are present. The second combiner KO2' brings the signals with different carrier frequency together to the single output. In FIG. 3 signals of different carrier frequency are represented by arrows having different line widths.

Figure 3:
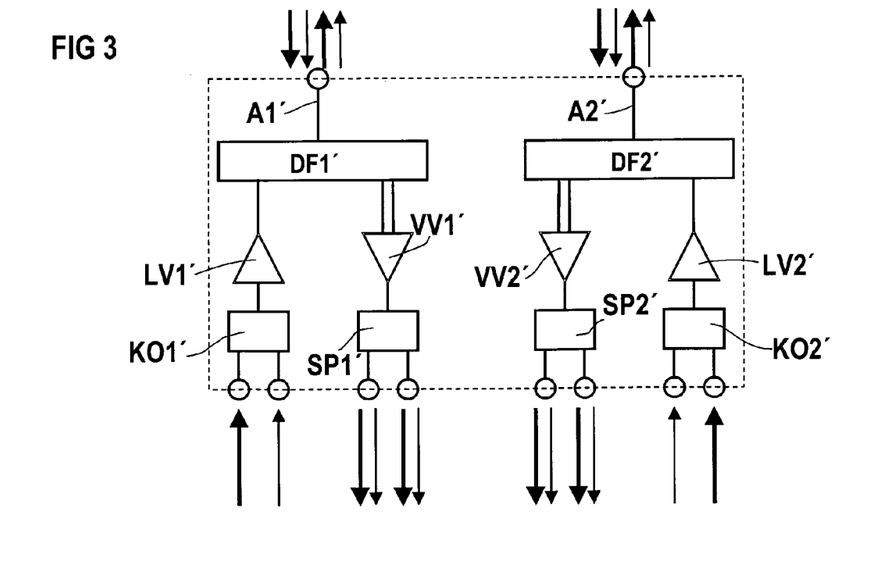
FIG. 3 shows a common high-frequency component for a base station with a diversity of transmission and reception.

In order to set up a radio communication system having a plurality of sectors, a common high-frequency component, as described on the basis of FIG. 2 or 3, is provided per sector.

Figure 4:
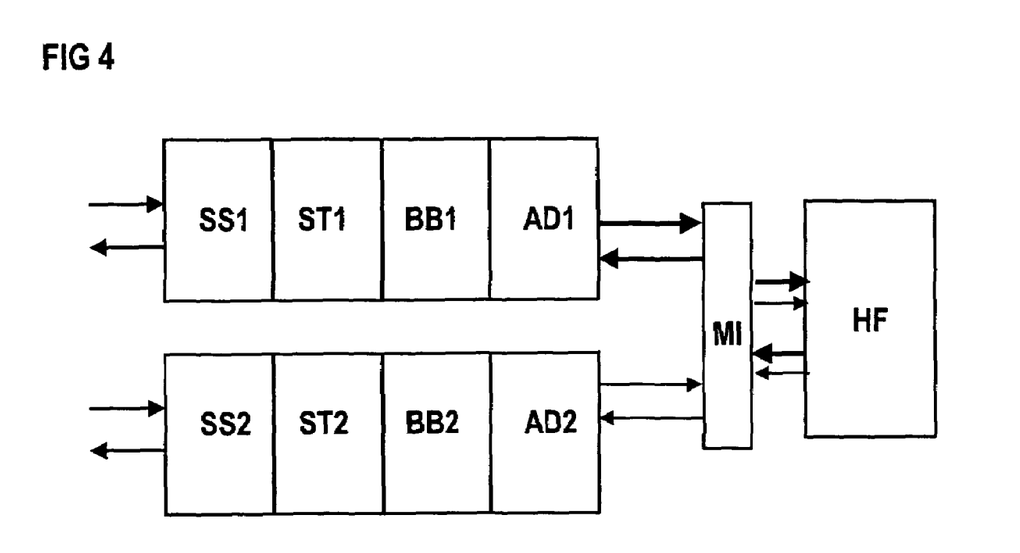
FIGS. 4 and 5 show base stations with a common high-frequency component and a signal processing device which in terms of software is split into two logical signal processing devices.

FIG. 4 shows a base station having a common high-frequency unit HF, HF', which is structured as described, for example, on the basis of FIG. 2 and FIG. 3. The base station additionally has a signal processing device. In the signal processing device two logically independent signal processing devices are emulated by dp programs. A first signal processing device comprises a first conversion unit AD1' for AD/DA conversion and first baseband processing BB1', a first control unit ST1' and a first interface unit SS1'. A second signal processing device comprises a second conversion unit AD2' for AD/DA conversion, a second baseband processing device BB2', a second control unit ST2', and a second interface unit SS2'. Moreover the generation or downmixing of a high-frequency signal takes place in a mixer unit MI' between AD/DA converter and high-frequency component. The logically split units are only generated using software. The dp programs run on the same hardware. The dp programs access independent databases which contain user-specific settings. The dp programs enable two mutually independent procedures for signal processing to be made available. The signals to be processed are assigned to the first signal processing device or the second signal processing device on the basis of the carrier frequency of the signal in question.

Figure 5:
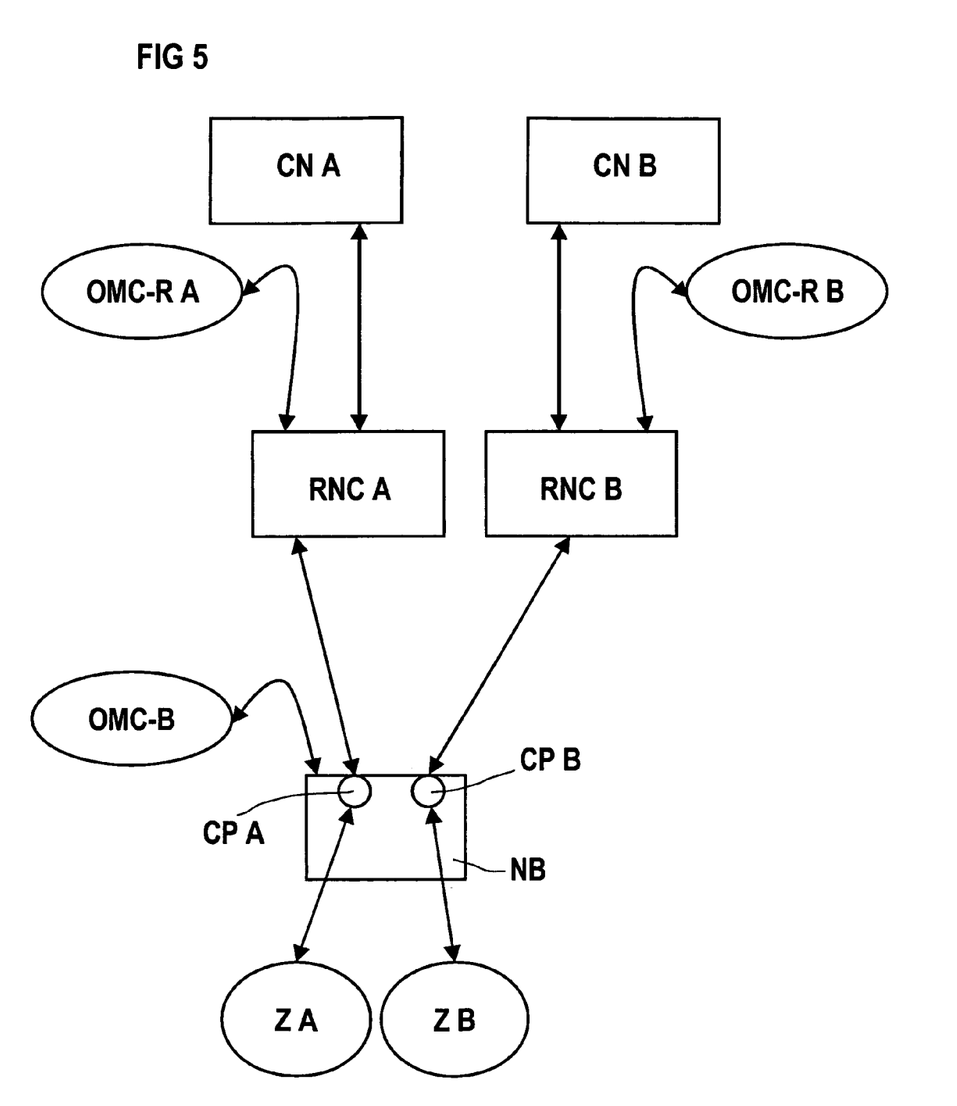
Figure 6:
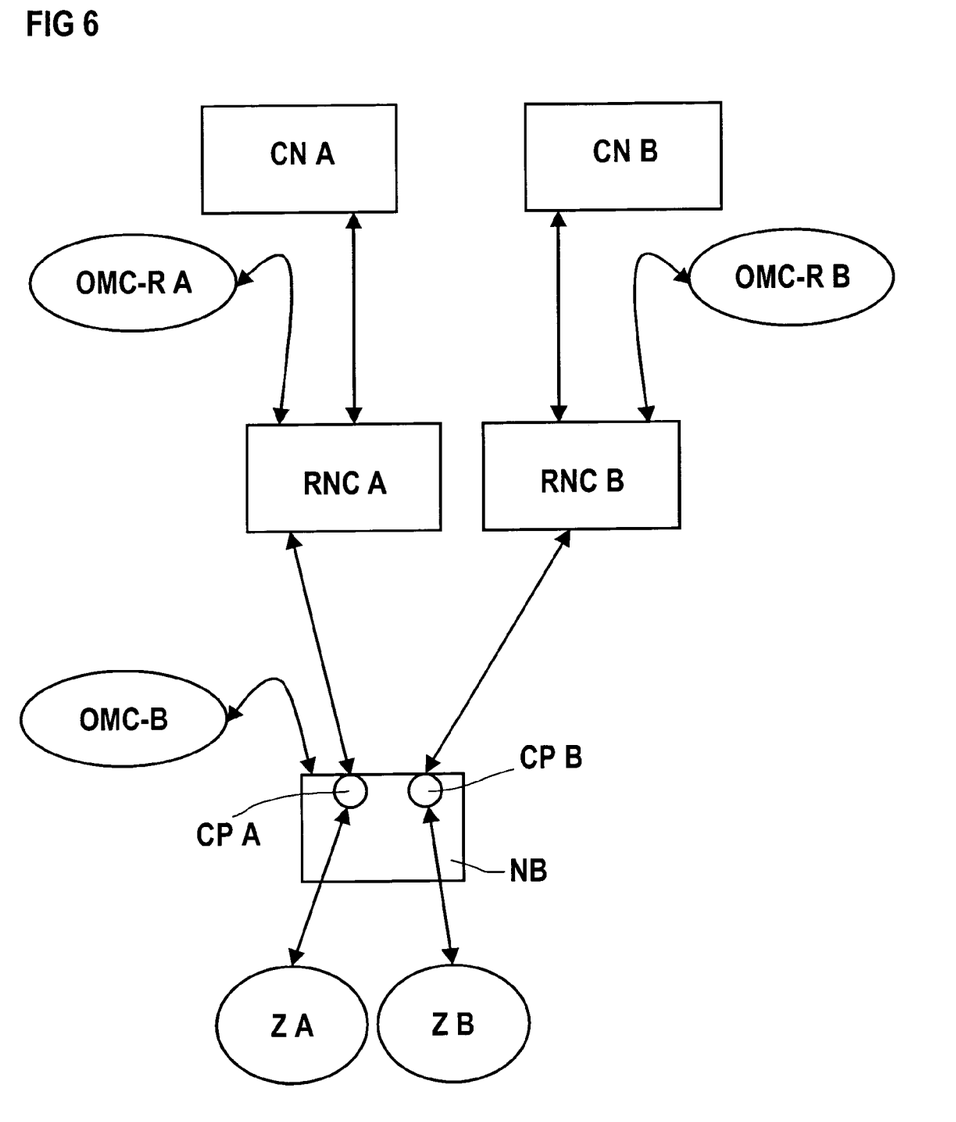
FIG. 6 shows a radio communication system in which two communication ports are installed in a base station and are assigned to different radio network controllers.

FIG. 5 shows a radio communication system comprising a first core network CN A which communicates with a first radio network controller RNC A. The first radio network controller RNC A is controlled by a first operation and maintenance center OMC-R A. The first core network CN A, the first radio network controller RNC A and the first operation and maintenance center OMC-R A form a functional unit A which is controlled by a first operator A. The radio communication system has a further core network CN B which communicates with a second radio network controller RNC B. The second radio network controller RNC B is controlled by a second operation and maintenance center OMC-R B. The second core network CN B, the second radio network controller RNC B and the second operation and maintenance center OMC-R B form a functional unit B which is controlled by a second operator B.

A first communication port CP A is installed in a base station NB for the functional unit A and a second communication port CP B for the functional unit B. The first communication port CP A is permanently assigned to the first radio network controller RNC A. The second communication port CP B is permanently assigned to the second radio network controller RNC B. From the perspective of the first radio network controller RNC A, and of the second radio network controller RNC B there is consequently a one-to-one relationship between radio network controller RNC A and RNC B and communication port CP A and CP B respectively of the base station NB. Installation of a communication port for a functional unit of a logically split base station is not restricted by the standard designated 3GPP TS 25.430 V3.6.0 (UTRAN Iub Interface: General Aspects and Principles (Release 1999)). As a result it is possible to define several unique logical relationships between the functional units of a base station and different radio network controllers with the aid of communication ports.

Signals for first communication connections which are sent via the first radio network controller RNC A, and second communication connections which are sent via the second radio network controller RNC B are processed in the functional units of the base station NB in a common signal processing device and a common high-frequency component. The data to be sent on the first communication connections and that to be sent on the second communication connections is in each case provided with identifiers taken from the standard, such as for example the "cell ID", which defines whether they are associated with the first radio network controller RNC A or the second radio network controller RNC B. These identifiers are additionally used as a basis for defining an assignment to a first cell A assigned to the first operator A, and to a second cell B assigned to the second operator B. Signals received by the base station NB from the cell Z A or Z B are transmitted to the relevant associated communication port CP A or CP B in each case on the basis of the identifiers and from there are sent via the respective Iub interface to the radio network controller RNC A or RNC B. The first communication connection and the second communication connection sent by different operators A, B are differentiated on the basis of the identifiers and of the communication port CP A or CP B respectively. Signal processing in the base station is identical for the signals of both communication connections. The entire signal processing capacity of the base station ND can thus be employed for the signals to be processed in each case.

To be able to process larger volumes of messages, it is advantageous to provide a plurality of signal processing devices in the base station which are accommodated on a plurality of processor cards operating as a pool. This means that the signals of the first communication connections and those of the second communication connections have equal access to the available processor capacity.

Differentiation takes place as mentioned above, on the basis of the identifiers via the communication ports CP A, CP B.

The base station NB is controlled by a third operation and maintenance center OMC-B. The base station NB is thus controlled by just one operator. However, since the logical control of the signals of the first communication connections is performed by the operation and maintenance center OMC-R A for the operator A and of the signals of the second communication connections by the operation and maintenance center OMC-R B for the operator B, it is not possible for one operator to influence those logical resources controlled and administered via the communication connections of the other operator. Control and administration of the logical resources can be completely categorized within the meaning of the regulatory authority for telecommunications and post as relevant for the functional and thus competitive independence of an operator. The fact that mutual influence of the logical resources is ruled out is thus in conformity with the regulations of the regulatory authority for telecommunications and post.

The invention has been described in detail with particular reference to preferred embodiments thereof and examples, but it will be understood that variations and modifications can be effected within the spirit and scope of the invention.

The invention claimed is:

1. A radio communication system, comprising:
   a base station to transmit first signals for first communication connections, the first signals being transmitted via an air interface using a first carrier frequency, and to transmit second signals for second communication connections, the second signals being transmitted via the air interface using a second carrier frequency;
   a first radio network controller to communicate the first communication connections with the base station; and
   a second radio network controller to communicate the second communication connections with the base station;
   the base station comprising:
      a common high-frequency component which processes signals of the first communication connections and signals of the second communication connections;
      a first communication port and a second communication port, the first communication port being connected to the first radio network controller and the second communication port being connected to the second radio network controller, wherein
      in the base station, the first communication connections are communicated via the first communication port and the second communication connections are communicated via the second communication port, and
      the base station assigns the first and second communication connections respectively to the first and second communication ports on the basis of connection identifiers provided in data of the first and second communications connections.

2. A radio communication system according to claim 1, wherein
   the high-frequency component has a send branch and a receive branch,
   the send branch and the receive branch are connected to an antenna via a duplex filter to split send and receive bands,
   the send branch comprises a power amplifier,
   the receive branch comprises a pre-amplifier, and
   the receive branch has a splitter which is connected to the output of the pre-amplifier and which has two broadband outputs which each cover the complete receive band.

3. A radio communication system according to claim 2, wherein
the common high-frequency component comprises a first high-frequency branch and a second high-frequency branch, the first high-frequency branch being connected to a first antenna and the second high-frequency branch being connected to a second antenna,
the first high-frequency branch and the second high-frequency branch are essentially identical in structure and each have a duplex filter, a send branch with a power amplifier and a receive branch with a pre-amplifier and a splitter, and
signals with the first carrier frequency are sent to the send branch of the first high-frequency branch and signals with the second carrier frequency are sent to the send branch of the second high-frequency branch.

4. A radio communication system according to claim 3, wherein
the send branch in each case has a combiner to which signals with the first carrier frequency and signals with the second carrier frequency are sent, and the output of which is connected to the input of the power amplifier.

5. A radio communication system according to claim 1, wherein
the base station transmits signals to or receives signals from a plurality of sectors, and in which a common high-frequency component is provided in the base station for each sector.

6. A radio communication system according to claim 1, wherein
the base station has a plurality of signal processing devices which are employed as a pool, in order to process signals of first communication connections and signals of second communication connections.

7. A radio communication system according to claim 1, wherein
the base station has a signal processing device in which data processing programs are provided for processing the signals with the first carrier frequency and the signals with the second carrier frequency, the data processing programs emulating two logical signal processing devices.

8. A radio communication system according to claim 4, wherein
the base station transmits signals to or receives signals from a plurality of sectors, and in which a common high-frequency component is provided in the base station for each sector.

9. A radio communication system according to claim 8, wherein
the base station has a plurality of signal processing devices which are employed as a pool, in order to process signals of first communication connections and signals of second communication connections.

10. A radio communication system according to claim 9, wherein
the base station has a signal processing device in which data processing programs are provided for processing the signals with the first carrier frequency and the signals with the second carrier frequency, the data processing programs emulating two logical signal processing devices.

11. A radio communications system, comprising:
a first radio network controller to communicate first communication connections associated with a first carrier frequency;
a second radio network controller to communicate second communication connections associated with a second carrier frequency, different from the first carrier frequency; and
a base station to communicate the first communications connections with the first radio network controller and the second communications connections with the second radio network controller, the base station transmitting both the first communication connections and second communication connections, the base station having a common high frequency component which processes signals for the first communication connections and signals for the second communication connections, the base station having a first communication port and a second communication port, the first communication port being connected to the first radio network controller and the second communication port being connected to the second radio network controller, wherein
in the base station, the first communication connections are communicated via the first communication port and the second communication connections are communicated via the second communication port, and
the base station assigns the first and second communication connections respectively to the first and second communication ports on the basis of connection identifiers provided in data of the first and second communications connections.

12. A radio communications system according to claim 11, wherein the base station has a common signal processing device to process both the first and second communication connections, the base station using software so that the common single processing device emulates at least two signal processing devices.

13. A base station for a radio communications system, comprising:
a communication unit to communicate first communications connections with a first radio controller and to communicate second communications connections with a second radio network controller, the base station transmitting signals of both the first communication connections and second communication connections, the signals of the first and second communication connections being transmitted via different wireless carrier frequencies;
a common high frequency component which processes signals of the first communication connections and signals of the second communication connections; and
a first communication port and a second communication port, the first communication port being connected to the first radio network controller and the second communication port being connected to the second radio network controller, wherein
in the base station, the first communication connections are communicated via the first communication port and the second communication connections are communicated via the second communication port, and
the base station assigns the first and second communication connections respectively to the first and second communication ports on the basis of connection identifiers provided in data of the first and second communications connections.

14. A base station according to claim 13, further comprising a common signal processing device to process both the first and second communication connections, the base station using software so that the common single processing device emulates at least two signal processing devices.

* * * * *